US007866253B2

(12) United States Patent
Böttger et al.

(10) Patent No.: US 7,866,253 B2
(45) Date of Patent: Jan. 11, 2011

(54) PRESSURE MEDIUM-ACTUATED UNIT

(75) Inventors: Christian Böttger, Birkach (DE); Rainer Beilner, Schweinfurt (DE); Matthias Reuβ, Werneck/Stettback (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 401 days.

(21) Appl. No.: 12/012,143

(22) Filed: Jan. 31, 2008

(65) Prior Publication Data

US 2008/0185796 A1 Aug. 7, 2008

(30) Foreign Application Priority Data

Feb. 1, 2007 (DE) ...................... 10 2007 005 839

(51) Int. Cl.
*F15B 15/12* (2006.01)
*F16L 55/04* (2006.01)

(52) U.S. Cl. ........................................ 92/120; 188/290

(58) Field of Classification Search ................. 92/85 A, 92/85 B, 85 R, 120, 122, 143; 280/5.511; 188/290
See application file for complete search history.

(56) References Cited

U.S. PATENT DOCUMENTS

| | | | | |
|---|---|---|---|---|
| 2,038,533 | A * | 4/1936 | Bliss et al. | 188/269 |
| 5,601,165 | A * | 2/1997 | Oppitz et al. | 92/125 |
| 5,791,444 | A * | 8/1998 | Schiffler | 188/293 |
| 5,810,129 | A * | 9/1998 | Hanawa et al. | 188/308 |
| 5,826,687 | A * | 10/1998 | Bungeler et al. | 188/296 |
| 6,181,034 | B1 * | 1/2001 | Reichel et al. | 92/125 |
| 7,207,574 | B2 * | 4/2007 | Gradu et al. | 280/5.511 |

FOREIGN PATENT DOCUMENTS

| | | |
|---|---|---|
| DE | 101 40 460 | 3/2003 |
| DE | 101 48 220 | 4/2003 |
| DE | 10 2004 039 767 | 3/2006 |
| DE | 10 2004 051 444 | 4/2006 |

OTHER PUBLICATIONS

Search Report dated Feb. 15, 2007 issued for the corresponding German Application No. 10 2007 005 839.1.

* cited by examiner

*Primary Examiner*—Thomas E Lazo
(74) *Attorney, Agent, or Firm*—Cohen Pontani Lieberman & Pavane LLP

(57) ABSTRACT

A pressure-medium actuated swivel motor includes a cylinder with closed ends and an inside surface with a pair of diametrically opposed axially extending ribs, and a motor shaft with a pair of diametrically opposed axially extending vanes, wherein the vanes and the ribs bound first and second pairs of diametrically opposed working chambers between the motor shaft and the cylinder. First and second pressure medium ports are connected to respective first and second pairs of working chambers, each pair being connected by an interconnection channel through the shaft. A movable separating element which divides a compensating space in the piston into a first and second compensating subspaces, wherein the first compensating subspace is connected to the first pair of working chambers, and the second compensating subspace is connected to the second pair of working chambers.

11 Claims, 4 Drawing Sheets

PRESSURE MEDIUM-ACTUATED UNIT

BACKGROUND OF THE INVENTION

1. Field of the Invention

The invention pertains to a pressure medium-actuated unit including a cylinder with closed ends and an inside surface with a pair of diametrically opposed axially extending ribs, and a motor shaft with a pair of diametrically opposed axially extending vanes, wherein the vanes and the ribs bound first and second pairs of diametrically opposed working chambers between the motor shaft and the cylinder.

2. Description of the Related Art

Pressure medium-actuated units are generally used to support the operating movement of a component. The component can be subjected to an external load. In the case of a unit designed as a swivel motor, e.g., in the chassis of a vehicle, a stabilizer arrangement can execute a swiveling movement, but, during a spring deflection of the wheels of an axle, it is also subjected to a load of much higher frequency than the rolling movement of a vehicle body and thus to pressure changes in the supply of pressure medium.

This problem of the pulsation of the pressure medium is explained in DE 10 2004 051 444 A1, and as a solution, a foam body is proposed, which is placed in at least one working chamber of the unit. This foam body is associated at least with the disadvantage that the operating distance of the unit is limited. In addition, care must be taken to ensure that, over the service life of the unit, no decomposition phenomena occur which lead to the release of particles from the foam body, because these particles could cause clogging in the unit or in the pressure supply system.

DE 10 2004 039 767 A1, which represents the prior art, discloses a swivel motor including a cylinder with closed ends and an inside surface with a pair of diametrically opposed axially extending ribs, and a motor shaft with a pair of diametrically opposed axially extending vanes, wherein the vanes and the ribs bound first and second pairs of diametrically opposed working chambers between the motor shaft and the cylinder. First and second pressure medium ports are connected to respective first and second pairs of working chambers, each pair being connected by an interconnection system. The first working chambers alternate with the second working chambers, and at least one working chamber is connected to a pressure compensation element.

The pressure compensation element is formed by a pressure-limiting valve, which opens in the direction toward the working chamber with the lower working pressure, so that pressure medium can flow from at least one working chamber of a first group into a working chamber of the second group.

The pressure-limiting valve opens as a function of the pressure difference between two working chambers of different groups. The elastic deflection of a wheel can cause the load in a first working chamber to decrease, while the adjacent working chamber can be compressed. As soon as the pressure difference falls below a certain value, the pressure-limiting valve opens, even though the working pressure in the compressed working chamber has still not reached a critical value. With respect to its opening behavior, the pressure-limiting valve cannot distinguish between an allowable peak pressure in the compressed working chamber and a momentary pressure difference between two adjacent working chambers.

Another solution is proposed in DE 101 40 460 C1, according to which the pressure medium-actuated unit is connected to an external air cushion, which is intended to prevent cavitation in a working chamber.

SUMMARY OF THE INVENTION

An object of the present invention is to provide a way to deal with the negative effect of the pressure pulsation in a pressure medium-actuated unit.

According to the invention, the pressure compensation element is formed by a compensating space, which is divided by a movable separating element, where each compensating subspace is connected to at least one working chamber of a pressure-medium port.

The great advantage of the invention is that, even though the two groups of working chambers are separated from each other, a lack or an excess of volume within the unit can still be compensated without the need for additional pressure medium to be moved from the outside.

The compensating space is advantageously connected to the interconnection system of two groups of working chambers. A lack of damping medium in one group of working chambers can be compensated by resupplying medium to the other group of working chambers, for which purpose only a single common pressure compensation means is required.

To obtain a unit with compact overall dimensions, the compensating space is located inside the motor shaft.

The separating element is preferably formed by a rigid disk.

To obtain a defined pressure behavior in the working chambers, the separating element is held in a starting position by oppositely-acting springs.

The interconnection system is formed by channels, which terminate in a lateral surface of the compensating space and which cooperate with the movable separating element to form a slider valve. The slider valve has the job of throttling the flow of pressure medium displaced by the separating element from the compensating subspace, so that the volumes of the compensating subspaces and thus also the volumes of the working chambers are not subject to abrupt changes.

In another advantageous embodiment, the separating element has a sleeve section, which slides on the lateral surface. This sleeve section cooperates with the end opening of the channels. The size of the volume which can be compensated can be adjusted by varying the length of the sleeve section.

The separating element can travel almost completely over the end opening of the connecting channel and thus close it off. To facilitate the restoring movement of the separating element back to the starting position, at least one after-flow opening is provided in the sleeve section. This opening lines up with the end opening at least when the separating element is in the maximally closed position.

A simple after-flow opening has an effect on the throttling effect of the slider valve. To minimize this effect, at least one check valve opening in the direction toward the compensating subspace is installed between at least one interconnection system and the compensating subspace connected to it.

The check valve is designed as part of the separating element and is formed by the after-flow opening, so little in the way of fabrication effort is required.

The after-flow opening is closed in a directionally dependent manner by a sealing ring, which is pretensioned from the inside against the sleeve section. This ring completes the check valve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
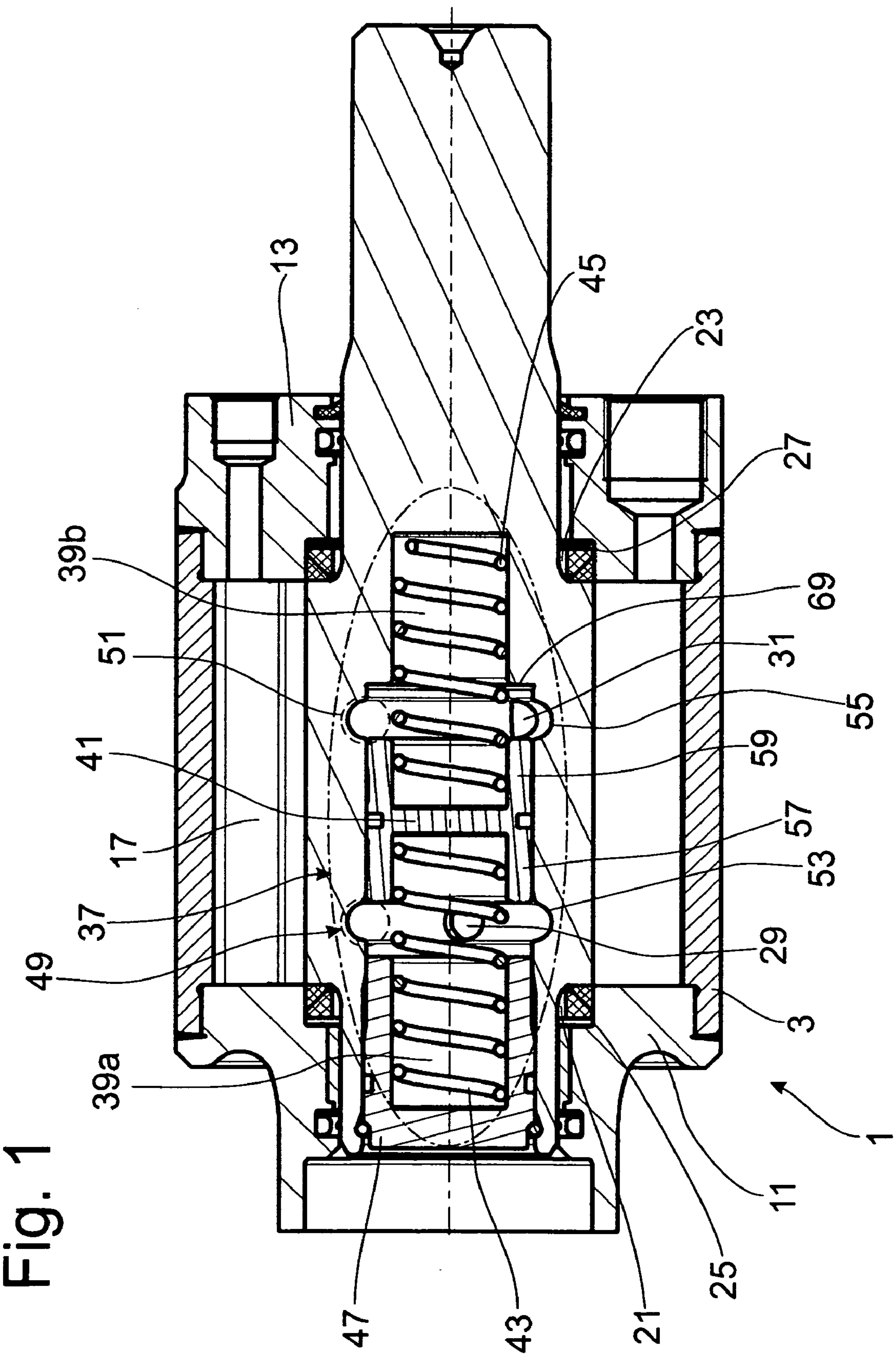
FIG. 1 shows a longitudinal cross section through the unit in the area of the working chambers.
Figure 2:
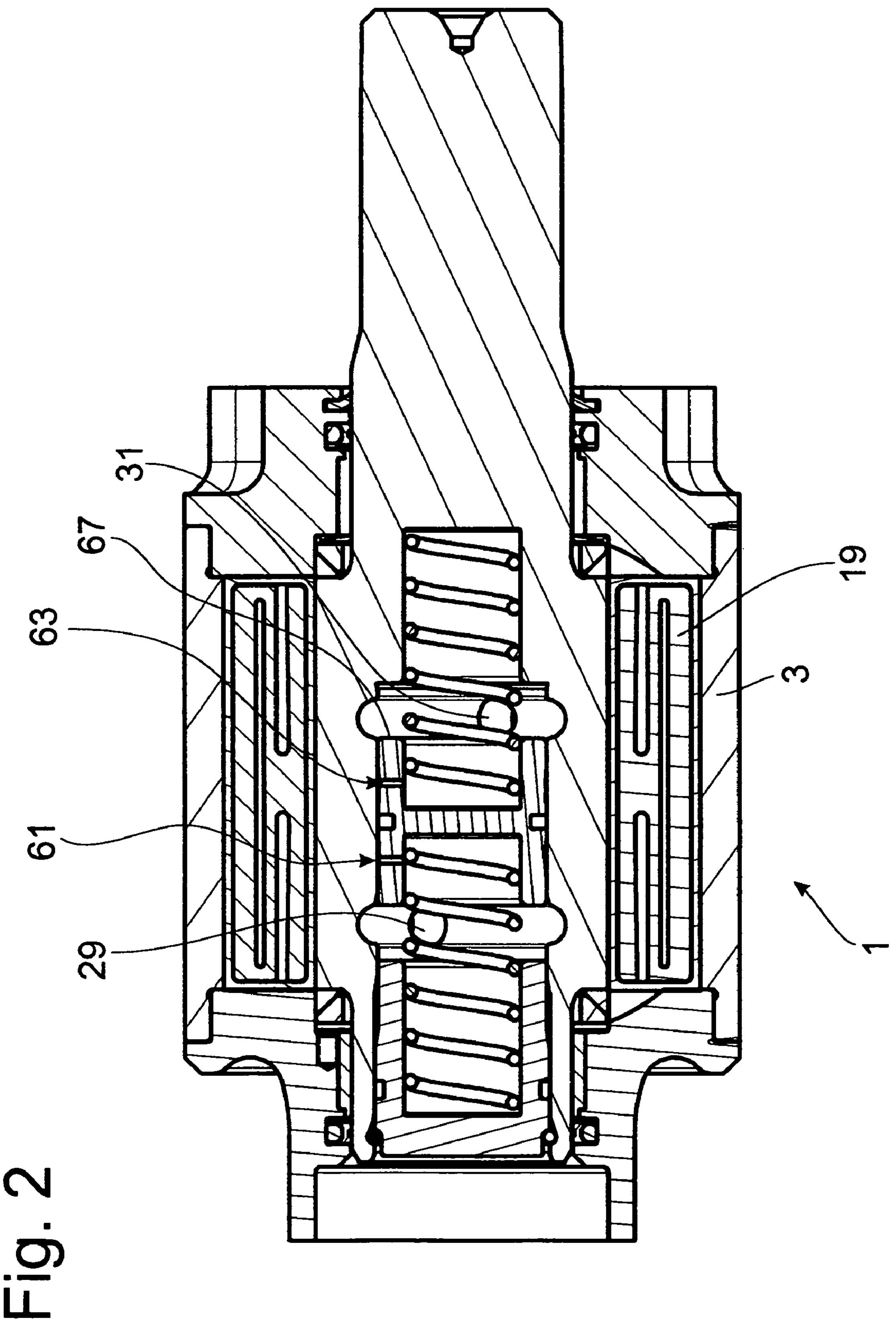
FIG. 2 shows a longitudinal cross section through the unit in the area of the seals between the working chambers.
Figure 3:
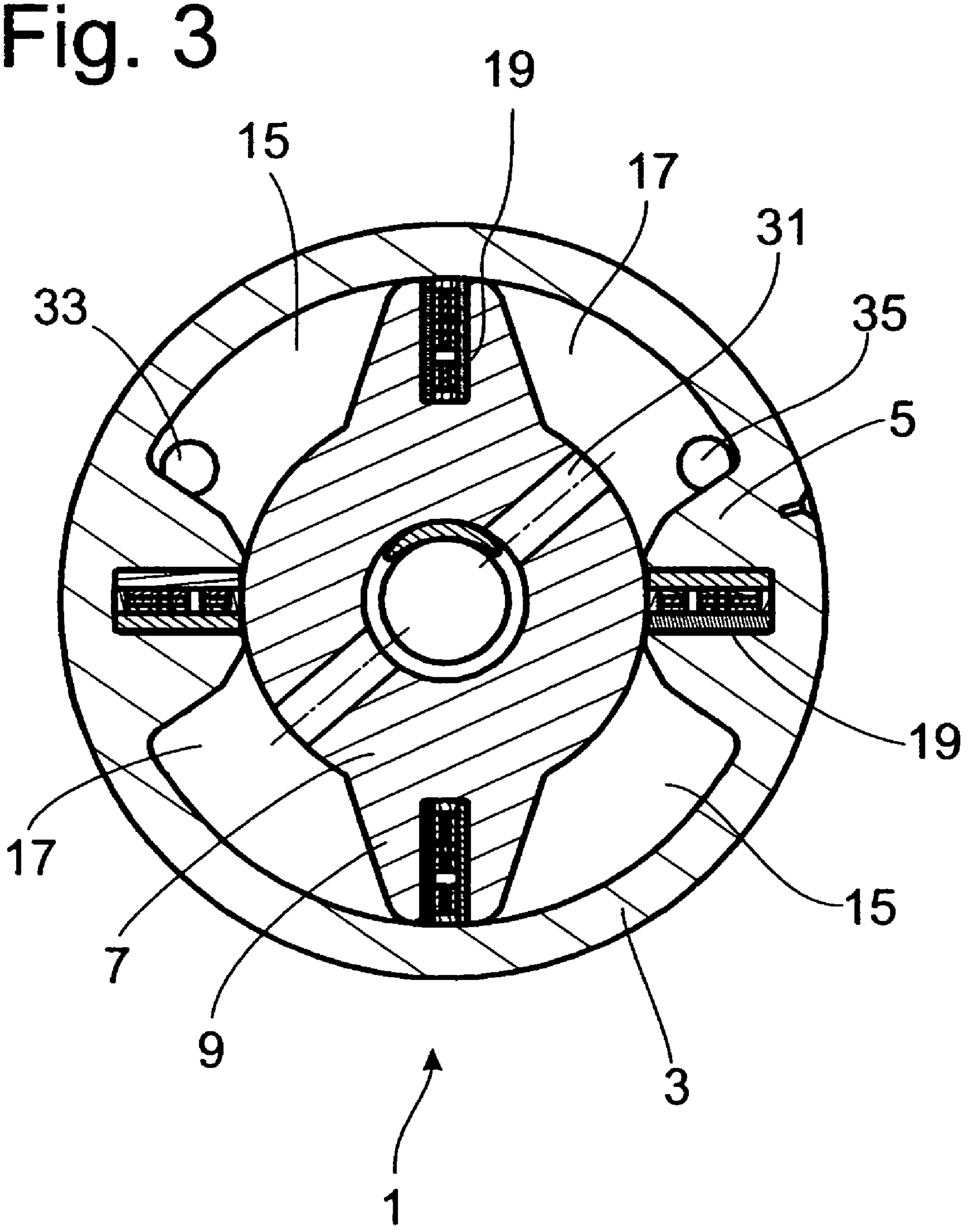
FIG. 3 shows a cross section through the unit in the area of the pressure compensation element.

FIG. 1, in conjunction with FIGS. 2 and 3, shows a swivel motor 1 in longitudinal cross section, the basic design of which is also assumed in the case of the following figures. The swivel motor 1 includes a cylinder 3, on the inside diameter of which axially oriented ribs 5 are provided. Inside the cylinder 3, a motor shaft 7 is supported with freedom of rotation. Vanes 9 are provided on the motor shaft; the vanes are parallel to the ribs 5. Each end of the cylinder 3 is sealed off by a cover 11, 13. The motor shaft with its vanes and the cylinder with its ribs in cooperation with the covers form working chambers 15, 17, which are separated from each other by seals 19 in the vanes and ribs. Shaft seals 25, 27, furthermore, which prevent the escape of pressure medium from the working chambers 15, 17, are installed in annular spaces 21, 23 in the covers 11, 13. The working chambers 15 are connected by a channel 29 in the motor shaft 7, and the working chambers 17 are connected by a channel 31 in the motor shaft 7. A first pressure medium port 33 supplies the working chambers 15 via the channel 29, and a second pressure medium port 35 fulfills the same function for the working chambers 17 via the channel 31. The same pressure level prevails in the working chambers which are connected to each other. By in inflow or outflow of pressure medium via the pressure medium ports 33, 35, the swivel motor generates a torque, which is used, for example, to shift the position of a split stabilizer inside the chassis of a vehicle.

To deal with the abrupt changes in pressure which occur in the working chambers 15, 17 under high-frequency external loads, a pressure compensation element 37 is provided, which is formed by a compensating space 39, which is divided by a movable separating element 41 into two compensating subspaces 39*a*, 39*b*. The compensating subspace 39*a* is connected to the group of working chambers 15 of the pressure medium port 33, and the compensating subspace 39*b* is connected to the group of working chambers 17 of the pressure medium port 35.

The separating element 41 is formed by a slider with a disk-shaped base body and is held in a starting position by oppositely-acting springs 43, 45. The compensating space 39 is located inside the motor shaft 7, at the interconnection system, i.e., between channels 29, 31, of the two groups 15, 17 of working chambers. A terminal, sealed cover 47 closes off the blind bore in the motor shaft 7 forming the compensating space 39. The spring 43 is supported against the cover 47, and the spring 45 is supported against the base of the blind bore.

The channels 29, 31 terminate in a lateral surface of the compensating space, and their end openings cooperate with the movable separating element 41 to form slider valves 49, 51, which execute oppositely directed opening and closing movements. That is, the element 41 is a slider which opens valve 49 when closing valve 51 and vice versa. Circumferential grooves 53, 55 are machined into the lateral surface of the bore in the motor shaft; even when the slider valve is closed, therefore, one of these grooves will still allow a connection between the working chambers of one of the groups 15, 17.

The separating element 41 has sleeve sections 57, 59, which slide on the lateral surface of the compensating space 39; these sleeve sections cooperate with the end openings of the channels 29, 31. A certain axial distance away from the end surface of the sleeve sections 57, 59, there is at least one after-flow opening 61, 63 (see FIG. 2), which, when the separating element is in the maximally closed position, is lined up with the end opening of the associated channel 29, 31.

Figure 4:
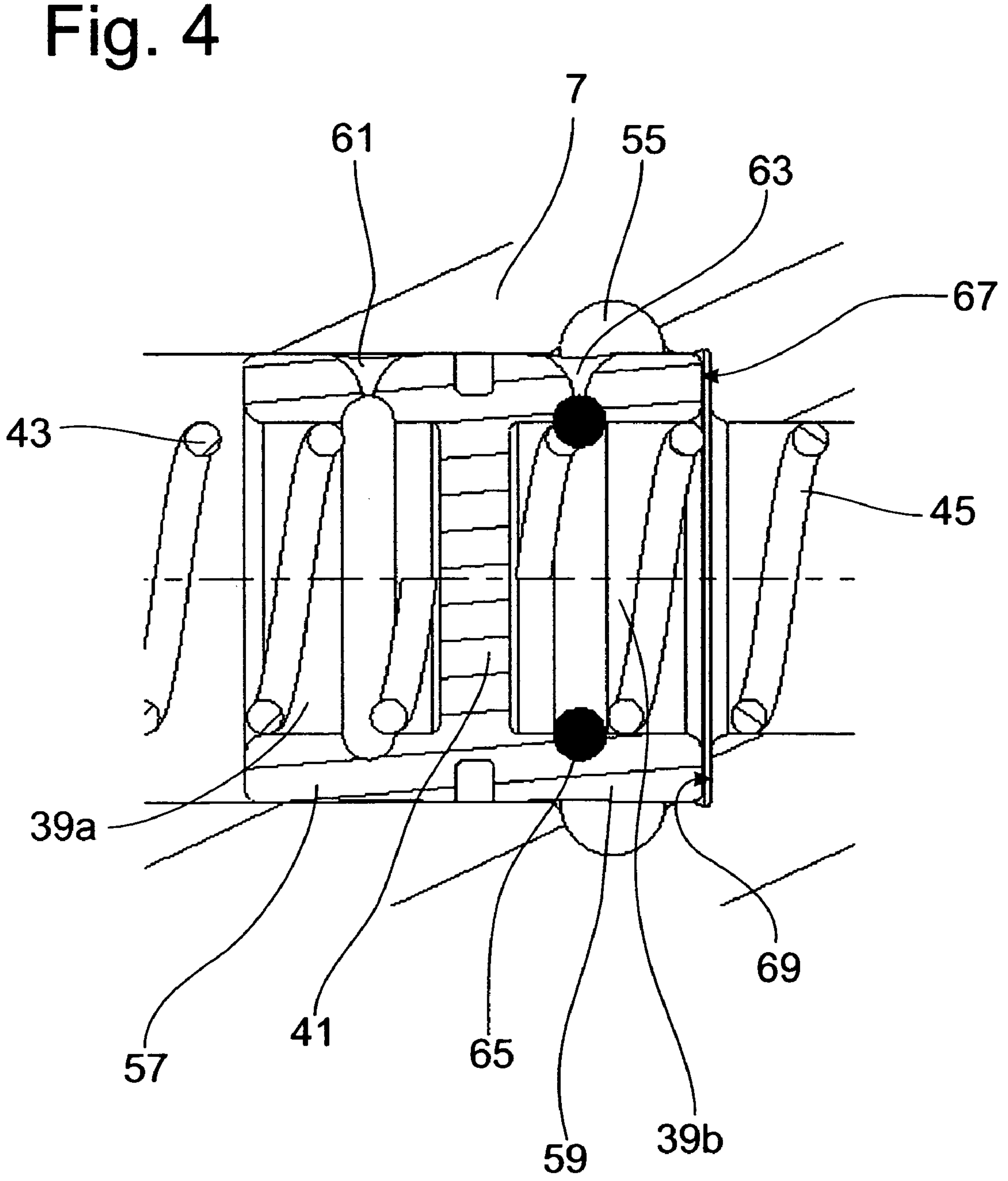
FIG. 4 shows part of the pressure compensation element.

At least one check valve, which opens in the direction toward the associated compensating subspace, is installed between the interconnection system, i.e., channels 29, 31, and the compensating subspace 39*a*, 39*b* connected to them. This check valve is formed by the minimum of one after-flow opening 61, 63 in the sleeve section 57, 59 of the separating element 41. The after-flow opening 61, 63 is sealed off from the inside against the sleeve section 57, 59 by a pretensioned sealing ring 65 (FIG. 4).

FIGS. 1 and 2 show the separating element 41 in an intermediate position, when the inflow of pressure medium into the one group of working chambers is active in spite of the outflow of pressure medium at a corresponding backpressure in the other group of working chambers. Especially when there is a sudden pressure drop in one of the groups of working chambers, the separating element 41 shifts axially against the force of, for example, the spring 45 toward the base of the blind bore. Thus a volume of pressure medium corresponding to the cross section of the inside diameter of the compensating space 39*b* multiplied by the distance traveled by the separating element is displaced through the annular groove 55 into the channel 31 and thus into the working chambers 17, so that a negative pressure cannot develop. A reduced volume in one group of working chambers is compensated by the movement of the separating element in conjunction with an increase in the volume of the other group of working chambers in the area of the compensating subspace.

The sleeve section 59 can travel over the annular groove 55 and reduce the transfer cross section between the compensating space 39*b* and the annular groove 55. In the end position, the end surface 67 of the sleeve section 59 rests on a shoulder 69 of the compensating space 39*b*. If present, the after-flow opening 63 is then lined up with the annular groove 55. The after-flow opening can be omitted, if, for example, a sufficiently large gap is present between the sleeve sections and the lateral surface of the compensating space.

After the sudden pressure difference has been compensated, the separating element 41 can be moved back into the starting position by the still-present difference between the forces of the two springs; this continues until the spring forces are in equilibrium. The continuous pressure supply to all the working chambers and the throttled movement of the separating element ensure that the pressure medium flows quietly inside the unit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure-medium actuated swivel motor comprising:

a cylinder with closed ends and an inside surface with a pair of diametrically opposed axially extending ribs;

a motor shaft with a pair of diametrically opposed axially extending vanes, said vanes and said ribs bounding first and second pairs of diametrically opposed working chambers between said motor shaft and said cylinder;

a first pressure medium port connected to said first pair of working chambers, said first pair of working chambers being connected by a first interconnection channel through said shaft;

a second pressure medium port connected to said second pair of working chambers, said second pair of working chambers being connected by a second interconnection channel through said shaft; and a pressure compensation element formed by a movable separating element which divides a compensating space into a first compensating subspace and a second compensating subspace, wherein said first compensating subspace is connected to said first pair of working chambers, and said second compensating subspace is connected to said second pair of working chambers, wherein the compensating space is connected to the interconnection channels.

2. The swivel motor of claim 1 wherein the compensating space is inside the motor shaft, the first and second interconnection channels intersecting said compensating space.

3. The swivel motor of claim 2 wherein the separating element cooperates with said first and second interconnection channels to form a slider valve.

4. The swivel motor of claim 3 wherein the separating element comprises a sleeve section which slides in said compensating space.

5. The swivel motor of claim 4 wherein said sleeve section has at least one after-flow opening which connects a respective at least one said compensating subspace with a respective at least one said interconnection channel when the slider valve in a respective at least one maximally closed position.

6. The swivel motor of claim 5 wherein said after-flow opening forms a check valve which opens toward the respective compensating subspace.

7. The swivel motor of claim 6 further comprising a flexible sealing ring inside said compensating subspace and loaded against said after-flow opening.

8. The swivel motor of claim 1 further comprising at least one check valve between a respective at least one said interconnection channel and a respective at least one said compensating subspace, said check valve opening toward the compensating subspace.

9. The swivel motor of claim 8 wherein the check valve is in the separating element.

10. A pressure-medium actuated swivel motor comprising:

a cylinder with closed ends and an inside surface with a pair of diametrically opposed axially extending ribs;

a motor shaft with a pair of diametrically opposed axially extending vanes, said vanes and said ribs bounding first and second pairs of diametrically opposed working chambers between said motor shaft and said cylinder;

a first pressure medium port connected to said first pair of working chambers, said first pair of working chambers being connected by a first interconnection channel through said shaft;

a second pressure medium port connected to said second pair of working chambers, said second pair of working chambers being connected by a second interconnection channel through said shaft; and a pressure compensation element formed by a movable separating element which divides a compensating space into a first compensating subspace and a second compensating subspace, wherein said first compensating subspace is connected to said first pair of working chambers, and said second compensating subspace is connected to said second pair of working chambers, wherein the separating element comprises a rigid disk.

11. A pressure-medium actuated swivel motor comprising:

a cylinder with closed ends and an inside surface with a pair of diametrically opposed axially extending ribs;

a motor shaft with a pair of diametrically opposed axially extending vanes, said vanes and said ribs bounding first and second pairs of diametrically opposed working chambers between said motor shaft and said cylinder;

a first pressure medium port connected to said first pair of working chambers, said first pair of working chambers being connected by a first interconnection channel through said shaft;

a second pressure medium port connected to said second pair of working chambers, said second pair of working chambers being connected by a second interconnection channel through said shaft; and a pressure compensation element formed by a movable separating element which divides a compensating space into a first compensating subspace and a second compensating subspace, wherein said first compensating subspace is connected to said first pair of working chambers, and said second compensating subspace is connected to said second pair of working chambers, wherein said compensating element further comprises a pair of oppositely acting springs which center said separating element.

* * * * *